United States Patent
Vassilieff

(10) Patent No.: US 8,552,777 B2
(45) Date of Patent: Oct. 8, 2013

(54) METHOD FOR ADJUSTING A TIME BASE FOR A TIRE PRESSURE MEASUREMENT UNIT

(75) Inventor: Youri Vassilieff, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 13/515,611

(22) PCT Filed: Oct. 18, 2010

(86) PCT No.: PCT/EP2010/006342
§ 371 (c)(1), (2), (4) Date: Jun. 13, 2012

(87) PCT Pub. No.: WO2011/072766
PCT Pub. Date: Jun. 23, 2011

(65) Prior Publication Data
US 2012/0256668 A1    Oct. 11, 2012

(30) Foreign Application Priority Data
Dec. 15, 2009  (FR) ..................................... 09 06047

(51) Int. Cl.
*B60Q 1/00*    (2006.01)
(52) U.S. Cl.
USPC ............................ 327/162; 340/449; 701/36
(58) Field of Classification Search
USPC ................. 327/162, 141, 144, 145, 151, 155, 327/160, 113, 596; 330/1 R, 14, 16, 18, 330/29, 34, 35, 47, 48, 158; 701/36; 73/146.5; 340/449, 442, 447
See application file for complete search history.

(56) References Cited

U.S. PATENT DOCUMENTS

| | | | | |
|---|---|---|---|---|
| 6,895,315 | B2 * | 5/2005 | Brillion et al. | 701/33.6 |
| 7,543,489 | B2 * | 6/2009 | Abe et al. | 73/146 |
| 2002/0113692 | A1 * | 8/2002 | Normann et al. | 340/442 |
| 2004/0155764 | A1 * | 8/2004 | Ichinose | 340/447 |

(Continued)

FOREIGN PATENT DOCUMENTS

| | | |
|---|---|---|
| EP | 1 516 753 A1 | 3/2005 |
| EP | 1 849 627 A1 | 10/2007 |
| WO | 2004/037566 A1 | 5/2004 |

OTHER PUBLICATIONS

International Search Report, dated Jan. 21, 2011, from corresponding PCT application.

*Primary Examiner* — Lincoln Donovan
*Assistant Examiner* — Jung H. Kim
(74) *Attorney, Agent, or Firm* — Young & Thompson

(57) ABSTRACT

Method of controlling the drifting of a low-frequency LFO circuit in a wheel unit of a tire pressure monitoring system, each wheel unit including temperature and pressure sensors in conjunction with a signal control circuit, the sensors being activated according to an LFO circuit time base integrated into the control circuit. An RF emission circuit of each wheel unit transmits data stored in a memory and an identifier of the unit to a central unit. The emission circuit is regulated by a high-precision clock. In each wheel unit, a variation between a measured temperature and a reference temperature is compared with a variation threshold and a drift between the periods of the time base of the LFO circuit and of the clock is determined. The drift is used to adjust the time base to the period of the clock if the temperature variation $\Delta T_i$ is greater than this threshold $\Delta T$.

12 Claims, 2 Drawing Sheets

(56) References Cited

U.S. PATENT DOCUMENTS

Figure 1:
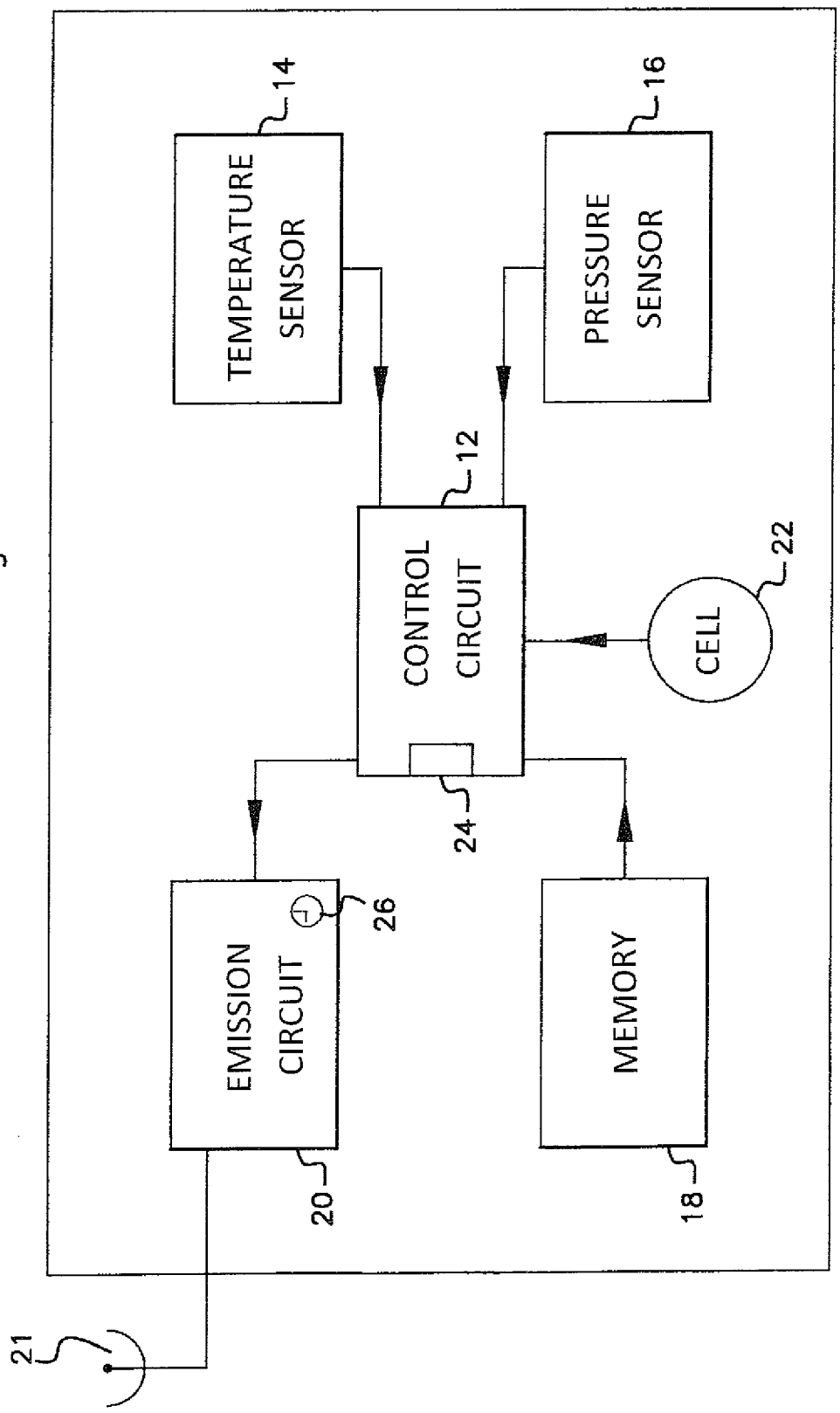

| | | | |
|---|---|---|---|
| 2005/0057347 A1* | 3/2005 | Baader et al. | 340/442 |
| 2007/0068240 A1* | 3/2007 | Watabe | 73/146.5 |
| 2012/0089299 A1* | 4/2012 | Breed | 701/36 |
| 2012/0319832 A1* | 12/2012 | Vassilieff | 340/447 |

\* cited by examiner

METHOD FOR ADJUSTING A TIME BASE FOR A TIRE PRESSURE MEASUREMENT UNIT

The invention relates to a method for adjusting a time base for triggering measurements in each wheel unit of a system for monitoring the pressure of tires, of the type known by the term TPMS (initials standing for "Tire Pressure Monitoring System").

In a TPMS system, the pressure measurements are performed in an onboard module embedded in each tested tire, termed a wheel unit. This unit comprises pressure and temperature sensors, a memory, an autonomous power supply in the form of a cell and a control circuit which receives the signals from these components so as to transmit data to a central unit, in conjunction with an emission circuit. A clock internal to the control circuit of each wheel unit regulates the tasks of the unit and, in particular, periodically triggers the pressure measurements. The measured and stored values are transmitted periodically by the emission circuit by radiofrequency (hereinafter RF) to the central unit for a comparative analysis between the pressures of the four tires.

In order to correlate without error the stored pressure measurements and the identification of the corresponding tires, precise regulating of the emissions is necessary, all the more so as the signal is emitted with a low strength so as to reduce transmission costs. The transmission of the signals to the central unit, performed by the emission circuit at a precisely defined frequency—433.92 MHz in Europe with a strict tolerance of +/−50 kHz—is therefore regulated by a precise clock, in general a quartz clock.

For cost reduction purposes, the signal control circuit possesses a clock time base adjusted by a low-frequency, or indeed very-low-frequency, oscillator circuit termed an LFO circuit (initials standing for Low Frequency Oscillator). Now, this type of circuit generates non-negligible, or indeed significant, variations in period, that is to say of possibly as much as +/−20 to 30%. This uncertainty makes it necessary to take into account a significant potential reduction in the lifetime of the battery cell, namely 10 years instead of the 14 years of duration as initially designed.

The invention is aimed at solving this problem of drifting of the low-frequency LFO circuit without increasing cost, while allowing use of the battery cell in an optimum manner throughout the duration.

Accordingly, the invention is based on an analysis of the triggerings of the sensors in conjunction with the internal temperature of the tire. It became apparent, indeed, that a considerable temperature variation of the air contained inside a tire, for example beyond a certain threshold, corresponded to tire treatments related to a behavior or to particular driving conditions that may induce a considerable variation in the time base of the control circuit. Such a correlation has been noticed for example during abrupt braking or significant acceleration.

More precisely, the subject of the invention is a method for adjusting a time base of a wheel unit of a system for monitoring the pressure of tires. Each wheel unit comprises at least sensors of pressure and of temperature of a tire in conjunction with a signal control circuit, the sensors being activated according to an LFO circuit time base integrated into the control circuit. Regulated by a high-precision clock, an RF emission circuit of each wheel unit transmits stored data as well as an identifier of the wheel unit to a central unit of the system. In each wheel unit, a variation between a measured temperature and a previously measured reference temperature is compared with a variation threshold and a drift between the periods of the time base of the LFO circuit and of the transmission clock is determined. If the temperature variation is greater than this threshold, the drift is taken into account so as to synchronize the time base to the period of the clock.

It is then possible to calibrate the LFO oscillator circuit against the quartz clock. Such calibration consists in measuring the number of cycles of the quartz clock contained in a cycle of the LFO clock. This number makes it possible to determine the real duration of the period delivered by the LFO circuit. Knowledge of this duration makes it possible to comply with the emission laws: for example, the US certification law enacted by the US Federal Communication Commission (FCC for short) imposes a duration of silence between two RF emissions equal to exactly thirty times the preceding emission duration.

Under these conditions, the precision of the time base of the LFO circuit may attain +/−1%, instead of +/−20 to 30%, and the lifetime of the cell gains by at least 15%.

According to particular modes of implementation:
the variation threshold is substantially equal to or greater than 10° C.;
the drift is calculated by taking the ratio of the number of periods of the time base of the transmission clock to the number of periods of the LFO circuit, for a given duration;
the temperature having prompted a time base adjustment is used as a reference for calculating the next temperature variation to be compared with the variation threshold;
the time base is adjusted when the pressure of the tire also exhibits a variation of greater than a given threshold.

Figure 2:
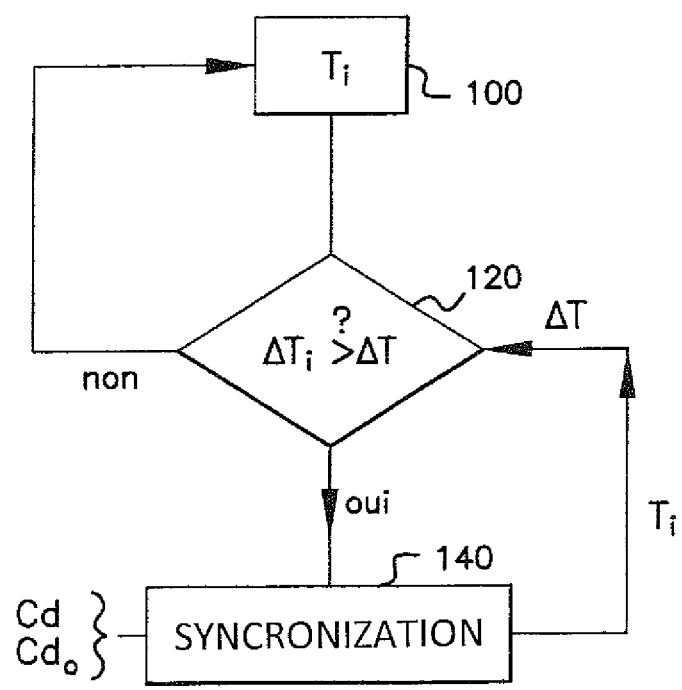

Other characteristics and advantages of the invention will become apparent on reading the description which follows and which pertains to a detailed exemplary embodiment, with reference to the appended figures which represent, respectively:

FIG. 1, a block diagram of a wheel unit of a TPMS system;

FIG. 2, a logic diagram for the processing of the data according to the invention so as to adjust the time base of each wheel unit.

With reference to the block diagram of FIG. 1, an example of wheel unit 10 mounted on the valve of a vehicle tire comprises a control circuit 12 (that is to say a digital processing unit or an elementary processor), which receives signals coming from the temperature sensor 14 and pressure sensor 16. The wheel unit also comprises a memory 18, an RF emission circuit 20 for transmitting data to a central unit of the vehicle (not represented) via an RF antenna 21. A battery cell 22 powers all the components via the control circuit 12. Other components such as an acceleration sensor can also be included.

The control circuit 12 activates the sensors 14 and 16 according to a rate defined by an LFO circuit 24. In the example, the frequency of the oscillator circuit 24 is 1 kHz. The measurements are digitized and stored in the memory 18 and transmitted to the emission circuit 20 via the control circuit 12. The circuit 20 comprises a quartz clock 26 which precisely regulates the emission of the values of the measurements of the sensors as well as the identifier of the concerned tire. The frequency of the quartz clock is here 13 MHz. The emission is of low strength so as to limit energy consumption and lengthen the lifetime of the battery cell 22. In the exemplary embodiment, an RF emission is transmitted every 16 seconds so as to comply with the standards relating to durations of emission.

The drifts of the LFO circuit are corrected by adjusting its period in relation to that of the quartz which exhibits a high regularity of vibration.

This adjustment is performed according to the invention in the case where the tire's internal temperature variation exceeds 10° C. Such a variation can occur during abrupt and/or significant changes of the behavior of the wheel, for example in the case of braking or acceleration.

To compensate for the drifts of the LFO oscillator circuit 24, the temperature is taken into account, at the level of the control circuit 12, by a digital control loop which uses the processor's elementary calculation means.

The logic diagram illustrated in FIG. 2 presents such a control loop. The measurement of the temperature Ti of the tire is digitized by a converter and input into a digital loop in step 100. The temperature of the air inside a tire can vary by about 30° C. According to the driving conditions and the behavior of the driver, this temperature can also vary significantly over time, for example between −40 and +120° C. A variation $\Delta T_i$ between the measured temperature $T_i$ and a previously measured reference temperature, here the previous temperature $T_{i-1}$, is compared with a variation threshold $\Delta T$, 10° C. in the exemplary embodiment (comparison box 120).

If this variation $\Delta Ti$ is greater than or equal to the threshold of 10° C. in the example, a step 140 of synchronization of the time base of the LFO circuit 24 is triggered.

In this step, a coefficient of drift Cd of the LFO circuit is then calculated by measuring in a counter the number of pulses of the quartz clock in a period of the LFO circuit, for example over a thousand time periods. This measurement provides in real time a value Cd of 11,500 (for the example chosen). By comparison with the theoretical value $Cd_0$ of this coefficient, here 13,000, the drift is −11.5% in the example.

This drift is then taken into account in the synchronization step 140 so as to compensate for the variation in the period of the LFO circuit. Accordingly, the duration for which each measurement is performed is set in proportion to the coefficient Cd so as to comply with the RF emission rate, here every 16 seconds. Thus, in this example, the duration of measurement is reduced by 11.5%.

The temperature $T_i$ thereafter serves as reference for calculating the next temperature variation $\Delta T_{i+1}$ to be compared with the variation threshold $\Delta T$ (step 120).

The invention is not limited to the examples described or represented. It is for example possible to apply the invention to circuits other than LFO circuits.

The invention claimed is:

1. A method for adjusting a time base of a wheel unit (10) of a system for monitoring the pressure of tires, each wheel unit comprising at least sensors of temperature (14) and of pressure (16) in conjunction with a signal control circuit (12), the sensors (14, 16) being activated according to an LFO circuit time base (24) integrated into the control circuit (12), an RF emission circuit (20) of each wheel unit (10), transmits stored data (18) as well as an identifier of the wheel unit (10) to a central unit of the system, the emission circuit being regulated by a high-precision clock (26), characterized in that, in each wheel unit (10), a variation ($\Delta$Ti) between a measured temperature (Ti) and a previously measured reference temperature is compared (120) with a variation threshold ($\Delta$T) and in that a drift between the periods of the time base of the LFO circuit (24) and of the transmission clock (26) is determined, the drift being taken into account (140) so as to synchronize the time base to the period of the clock if the temperature variation ($\Delta$Ti) is greater than this threshold ($\Delta$T).

2. The method of adjustment as claimed in claim 1, in which the variation threshold ($\Delta$T) is substantially equal to or greater than 10° C.

3. The method of adjustment as claimed in claim 1, in which the drift is calculated by taking the ratio of the number of periods of the time base of the transmission clock (26) to the number of periods of the LFO circuit (24), for a given duration.

4. The method of adjustment as claimed in claim 1, in which the temperature (Ti) having prompted a time base adjustment serves as reference for calculating (160) the next temperature variation to be compared with the variation threshold ($\Delta$T).

5. The method of adjustment as claimed in claim 1, in which the time base is also adjusted when the pressure of the tire exhibits a variation of greater than a given threshold.

6. The method of adjustment as claimed in claim 2, in which the drift is calculated by taking the ratio of the number of periods of the time base of the transmission clock (26) to the number of periods of the LFO circuit (24), for a given duration.

7. The method of adjustment as claimed in claim 2, in which the temperature (Ti) having prompted a time base adjustment serves as reference for calculating (160) the next temperature variation to be compared with the variation threshold ($\Delta$T).

8. The method of adjustment as claimed in claim 3, in which the temperature (Ti) having prompted a time base adjustment serves as reference for calculating (160) the next temperature variation to be compared with the variation threshold ($\Delta$T).

9. The method of adjustment as claimed in claim 6, in which the temperature (Ti) having prompted a time base adjustment serves as reference for calculating (160) the next temperature variation to be compared with the variation threshold ($\Delta$T).

10. The method of adjustment as claimed in claim 2, in which the time base is also adjusted when the pressure of the tire exhibits a variation of greater than a given threshold.

11. The method of adjustment as claimed in claim 3, in which the time base is also adjusted when the pressure of the tire exhibits a variation of greater than a given threshold.

12. The method of adjustment as claimed in claim 6, in which the time base is also adjusted when the pressure of the tire exhibits a variation of greater than a given threshold.

* * * * *